United States Patent
Kato et al.

(10) Patent No.: US 6,223,249 B1
(45) Date of Patent: Apr. 24, 2001

(54) APPARATUS AND METHOD FOR CONTROLLING ACCESS TO ONE OR MORE DISC STORAGE DEVICES

(75) Inventors: Yasunobu Kato, Kanagawa; Takashi Totsuka, Chiba; Hiroyuki Shioya, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/944,093

(22) Filed: Oct. 2, 1997

(30) Foreign Application Priority Data

Oct. 4, 1996 (JP) ................................... 8-264216

(51) Int. Cl.$^7$ ................................... G06F 12/00

(52) U.S. Cl. ................ 711/112; 711/173; 711/167; 711/170

(58) Field of Search .............. 711/4, 111, 112, 711/114, 170, 171, 173, 172, 167

(56) References Cited

U.S. PATENT DOCUMENTS

| | | |
|---|---|---|
| 4,899,342 | 2/1990 | Potter et al. . |
| 5,202,979 | 4/1993 | Hillis et al. . |
| 5,524,264 | 6/1996 | Shirota et al. . |
| 5,708,632 | 1/1998 | Totsuka et al. ................... 369/32 |
| 5,774,714 | * 6/1998 | Thapar et al. ................... 707/100 |

OTHER PUBLICATIONS

J. Smith, "Recovery from Transient Faults in Redundant Systems," IBM Technical Disclosure Bulletin, vol. 23, No. 4, Sep. 1980, pp. 1707–1709.

D. Patterson et al., "A Case for Redundant Arrays of Inexpensive Disks (RAD)," FIACM Sigmod Conference, Chicago, Jun. 1–3, 1988.

H. Boral et al., "Database Machines: An Idea Whose Time Has Passed? A Critique of the Future of Database Machines," Database Machines Int'l Workshop, Munich, Sep. 1983, pp. 166–187.

M. Kim, "Parallel Operation of Magnetic Disk Storage Devices: Synchronized Disk Interleaving," Database Machines Int'l Workshop, Bahamas, Mar. 1985, pp. 300–330.

D. Anderson et al., "A File System for Continuous Media," ACM Transactions on Computer Systems, vol. 10, No. 4, pp. 311–337, Nov. 1992.

(List continued on next page.)

*Primary Examiner*—B. James Peikari
(74) *Attorney, Agent, or Firm*—Limbach & Limbach L.L.P.

(57) ABSTRACT

The present invention relates to a method and a device for controlling access to a disc storage device comprising a plurality of discs storing a plurality of second data obtained by dividing first data, the disc being configured such that a number of sectors included at tracks in an outer section of the disc is greater than a number of sectors included at tracks in an inner section of the disc. In particular, the method and device for controlling disc array decides the discs storing each of a plurality of the second data, and information comprising the addresses of the second data on the disc and the size of each item of a plurality of the second data in such a manner that the time required for accessing each of a plurality of the second data stored in the disc device becomes equal, with access then being carried out to the disc device on the basis of the decided information. Further, each item of information is decided on the basis of a gap expressed by angular differences between the heads and ends of the second data at the time of arrangement of the second data on the discs. In this way, the overhead at the time of accessing data on the disc device can be reduced, the time required for reading and writing data can be fixed and input/output time can be easily estimated.

21 Claims, 23 Drawing Sheets

OTHER PUBLICATIONS

V. Rangan et al., "Efficient Storage Technique for Digital Continuous Multimedia," IEEE Transactions on Knowledge and Data Engineering, vol. 5, No. 4, pp. 564–573, Aug. 1993.

N. Reddy et al., "Disk Scheduling in a Multimedia I/O System," ACM Multimedia Int'l Conference, Anaheim, Aug. 1993, pp. 225–233.

J. Gemmel et al., "Delay–Sensitive Multimedia on Disk," IEEE Multimedia Journal, vol. 1, No. 3, Fall 1994, pp. 56–67.

M. Chen et al., "Optimization of the Grouped Sweeping Scheduling (GSS) with Heterogeneous Multimedia Streams," ACM Multimedia Int'l Conference, Anaheim, Aug. 1993, pp. 235–242.

S. Ng, "Improving Disk Performance via Latency Reduction," IEEE Transactions on Computers, vol. 40, No. 1, Jan. 1992, pp. 22–30.

White, *How Computers Work*, Ziff–Davis Press, USA, 1997, p. 93.*

* cited by examiner

1,#2,#3,#4,#5 • • •

3,#1,#2,#5,#4 • • •

ZONE BIT RECORDING (ZBR)

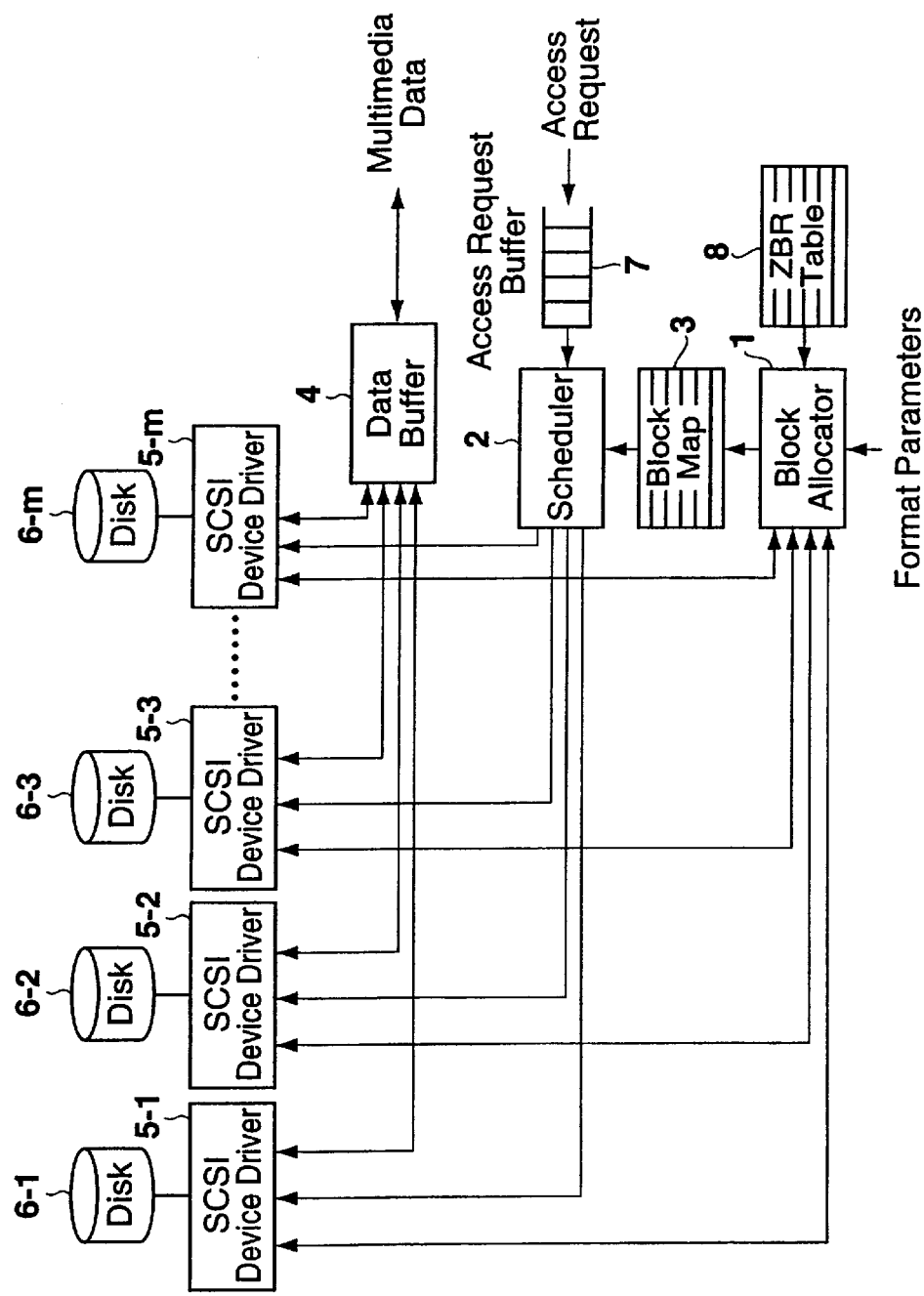

FIG. 10A

| Data No. | Disk ID | Logical Sector | Size |
|---|---|---|---|
| k | Dk1 | Lk1 | Sk1 |
|   | Dk2 | Lk2 | Sk2 |
|   | .. | .. | .. |
|   | Dkn | Lkn | Skn |

FIG. 10B

| Data No. | Disk ID | Logical Sector | Size |
|---|---|---|---|
| 1 | 1 | 0 | 200 |
|   | 2 | 1999 | 100 |
|   | 3 | 0 | 200 |
|   | 4 | 1999 | 100 |
| 2 | 2 | 0 | 200 |
|   | 3 | 1999 | 100 |
|   | 4 | 0 | 200 |
|   | 5 | 1999 | 100 |
| 3 | 3 | 10 | 198 |
|   | 4 | 1989 | 102 |
|   | 5 | 0 | 200 |
|   | 6 | 1999 | 100 |
| 4 | 4 | 10 | 198 |
|   | 5 | 1989 | 102 |
|   | 6 | 0 | 200 |
|   | 1 | 1999 | 100 |
| ... | ... | ... | ... |

FIG. 15B

| Logical Sector | Cylinder | Medium | Sector |
|---|---|---|---|
| 0 | 0 | 0 | 0 |
| 1 | 0 | 0 | 1 |
| 2 | 0 | 0 | 2 |
| 3 | 0 | 0 | 3 |
| 4 | 0 | 0 | 4 |
| 5 | 0 | 0 | 5 |
| 6 | 0 | 0 | 6 |
| 7 | 0 | 0 | 7 |
| .... | .... | .... | .... |

FIG. 15A

| Logical Sector | Cylinder | Medium | Sector |
|---|---|---|---|
| Lki | CYLki | MEDki | SECki |

APPARATUS AND METHOD FOR CONTROLLING ACCESS TO ONE OR MORE DISC STORAGE DEVICES

BACKGROUND OF THE INVENTION

1. Field of the Invention

The present invention relates to a method and a device for controlling access to a disc storage device and more particularly relates to a method and a device for controlling access to a disc storage device suitable for use in, for example, a so-called multimedia server demanding high capacity and a high transfer rate and that has to guarantee real time operation even for random accesses.

2. Description of the Related Art

A storage medium for use with multi-media data such as images and audio is referred to as a multi-media server. The following is usually demanded of multimedia servers.

1. High capacity and high transfer rate.
2. Random access.
3. Real time operation.

The background for the occurrence of these requirements and the technology for taking into consideration the fulfillment of these demands are described in the following.

Firstly, the reason why a large capacity and high transfer rate are required by a multi-media server is that the amount of data such as images and audio, etc., handled by multi-media servers is substantial and a high transfer rate is therefore required. With regard to these requirements, processing can then be carried out by adopting as a multimedia server a disc array system comprising a plurality of disc storage devices; i.e., it is possible to increase the transfer rate at the time of data reading and writing by running disc storage devices in parallel. Further, if a disc array system of a RAID (Redundant Arrays of Inexpensive Disks) configuration is adopted as the multi-media server, system reliability can be improved.

Secondly, random accessing is successively accessing data existing at physically separated places. Sequentially accessing data at physically consecutive places is referred to as sequential accessing. Multimedia data is the gathering of data in which continuity has a meaning, with sequential access usually being considered to be the main constituent even at the server. However, when actual applications are considered, this does not have to be the case.

For example, typical multimedia servers include non-linear editors and VOD (Video-On-Demand) servers. Non-linear editors use an editing method where images held in image storing places that are physically remote are instantaneously joined together without interruption. VOD is a service where a number of different sequence moving images are simultaneously provided while being randomly accessed in accordance with requests by a plurality of observers. Random access occurs, however, in whichever case and the server therefore has to deal with this.

Thirdly, real time processing means that there is a guaranteed upper limit put on the processing time. For example, if a moving image is not displayed at 30 images per second shown successively at fixed intervals, movement becomes unnatural. Further, if the disc processing power is insufficient so that the audio data is lacking, the sound will be discontinuous and a disagreeable noise will occur. Therefore, even in the worst case, it is important to guarantee an upper limit where processing can be carried out in at least this much time. Therefore, whereas in storage for use with related computers it has been average performance that has been considered important, with multimedia servers it is the maximum value for the processing time that is to be kept low.

It can therefore be understood that guaranteeing real time performance with random access is important for these multimedia servers. At the same time, this also puts demands on the disc storage device units comprising these multimedia servers; i.e., in exactly the same way, the disc storage devices have to be capable of reading or writing data that is at places separated physically on a recording surface successively within a decided period of time.

A time $T_{i/o}$ for accessing a sub-block arranged at a prescribed track on a disc recording medium is given by the sum of a time $T_{r/w}$ for actually reading or writing while the disc head is passing the sub-block, a seek time $T_{seek}$ for moving the head to the desired cylinder and a rotation wait time $T_{rd}$ from after the head is moved to the desired cylinder until the head of the data within the track appears.

$$T_{i/o} = T_{r/w} + T_{seek} + T_{rd}$$

Here, $T_{seek}$ and $T_{rd}$ are overhead time. In the case of sequential access, this overhead time is close to zero without there being any limit but with random access, disc performance deteriorates as the overhead time increases.

However, a method referred to as a SCAN algorithm exists as a related technology for reducing the seek time that is one cause of overhead time. This method is an algorithm for carrying out processing where, as shown in FIG. 1A, when there is a plurality of "Input/Output" (hereinafter abbreviated to "I/O") requests (#1, #2, #3, #4, #5), these requests are sorted across the radial direction of the disc and replaced with the order (#3, #1, #2, #5, #4) as shown in FIG. 1B. As shown in FIG. 1A, the coming and going of the head that is likely to occur when the I/O requests are processed in the order of arrival can be prevented and the respective seek times can therefore be reduced.

On the other hand, the following shown as a technology for reducing the rotation wait time that is a further cause of overhead time in U.S. application Ser. No. 731,861 (filed on Oct. 21, 1996), now U.S. Pat. No. 5,708,632, and its continuation application Ser. No. 889,906, filed on Jul. 10, 1997, now U.S. Pat. No. 5,914,916. Namely, a method where sub-block arrangement is carried out using skew present at angular differences present for the circular directions between heads of sub-blocks and both seek time and rotation wait time are suppressed in combination with a scan algorithm. FIG. 2 shows an example of arranging sub-blocks in the case where the skew and gap values are fixed.

In this way, control can be exerted so that the head of the desired sub-block does not exceed the position of the head during the seek operation by making the skew value fixed. Therefore, when the desired sub-block is accessed, it is only necessary to wait for a rotation time that is the time for the head of this sub-block to return again to the head position so that the rotation wait time can therefore be reduced.

Further, having the gap for the angular difference of the head and end of each block fixed also means that the time $T_{r/w}$ for actually reading or writing each block is also fixed. In order to estimate the time for one I/O the overhead time has to be known in addition to the time $T_{r/w}$ and this can be estimated from the graph shown in FIG. 3.

FIG. 3 shows the overhead time for a disc arranged with sub-blocks as shown in FIG. 2. Here, the horizontal axis shows the seek distance, i.e. the number of cylinders to be crossed over when the head for the disc is moved, and the vertical axis shows the time that this takes. The dotted-anddashed line is the seek time $T_{seek}$ and the solid line is the overall overhead time. As the overhead time is the sum of the seek time $T_{seek}$ and the rotation wait time $T_{rd}$, the difference between the solid line and the dotted-and-dashed line is therefore the rotation wait time $T_{rd}$.

In the above method of the aforementioned US application, the rotation wait time could not be estimated. Therefore, the maximum values for the overhead time can be calculated, as shown by the dotted line in the graph, with this value being calculated as $T_{seek}$ plus the time for one rotation. From this graph, by carrying out the arrangements of sub-blocks shown in FIG. 2, the overhead time can be kept small as shown by the solid line when compared with that described above shown by the dotted line.

Further, when the application of a SCAN algorithm to the kind of sub-block arrangement method shown in FIG. 2 is considered, when I/O requests occur with respect to sub-blocks present at equal distances in the cylinder direction as shown in FIG. 4, this can be understood to be that which requires the most time. The cylinder spacing $L_{avg}$ at this time is the average seek distance and the maximum value for the overhead time at the total occurring in a scan of one time can be calculated from the overhead time when the seek distance occurring in FIG. 3 is $L_{avg}$.

Not only was this value smaller than the time when just the SCAN algorithm was applied but was also extremely close to the maximum value that was actually observed. This can be taken as a reliable indication of the value estimated in the above way, with this being very useful in the design of multimedia servers.

There is, however, a formatting method for disc storage devices such as hard discs etc. referred to as "zone bit recording" (ZBR). Here, as shown in FIG. 5, the number of sectors per track is increased as the outer periphery is approached from the inner periphery under the conditions of a fixed recording density and a fixed disc rotational velocity. ZBR is a formatting method that increases the recording capacity of the disc by dividing the recording surface into a plurality of zones using distances from the center of the disc so as to make the number of sectors per outer zone greater than the number of sectors per inner zone.

FIG. 6 shows the relationship between the cylinder address and number of sectors per one track occurring at a disc storage device formatted using the ZBR method. Here, the horizontal axis shows the cylinder address and the vertical axis shows the number of sectors per track, with inner tracks having fewer sectors than outer tracks.

On the other hand, it is common for data such as images and audio etc. handled by a multimedia server to originally have been fixed length data. When this kind of fixed length data is stored on a multimedia server comprising m disc storage devices, a method is considered where the data are first divided into n (n≦m) sub-blocks of the same size. Then, n devices are selected from m disc storage devices and writing is carried out so as to fill these storage devices up in an order from the outer disc storage devices or from the inner disc storage devices. FIG. 7 shows an example of a case where the number of disc storage devices m is taken to be 6, the number of sub-blocks n into which the data is divided is taken to be 4, and sub-blocks are written in order from disc storage devices at the outer periphery.

However, at this time, when it is wished to use a ZBR formatted disc storage device, with the arrangement of the sub-blocks on a single disc storage device, the gap value is not fixed depending on the arrangement place as shown in FIG. 8A. In FIG. 8A the skew values have all been made 0 for convenience but in reality this skew value will not become fixed even if the skew value is a value other than zero.

FIG. 8B is a graph showing transitions in the size of gaps for each sub-block when going from the outer periphery towards the inner periphery. Here, the horizontal axis shows the track position and the vertical axis shows the size of the gap. The number of sectors per track becomes smaller when going from the outer periphery towards the inner periphery, with the gap value gradually becoming smaller in line with this gap value. Because of this, depending on the case it may not be possible for a sub-block to be fitted onto one track and a sub-block may therefore have to be put across two tracks, with the gap value therefore making a sudden jump from about 0 degrees to about 360 degrees.

When the gap is fixed, a method of arranging sub-blocks that is capable of suppressing rotation wait time can be easily obtained by setting the skew to an appropriate fixed value. However, when the gap is not fixed, methods for obtaining an appropriate skew are extremely complicated.

Further, the time $T_{r/w}$ for actually reading or writing while the head for the disc is passing over the sub-block is small when the sub-blocks are arranged from the outer periphery but is large when the sub-blocks are arranged from the inner periphery, as shown in FIG. 8C. In FIG. 8C, the horizontal axis shows the track position and the vertical axis shows the time necessary for reading or writing to and from each of the sub-blocks.

As described above with reference to FIG. 3, estimates for the maximum value for the time taken for one scan take place under the condition that the portion of time $T_{r/w}$ is fixed regardless of the place of arrangement of the sub-block. It is therefore possible to compare the portion of time $T_{r/w}$ with just the estimate deduced for the overhead time. However, when the time $T_{r/w}$ is changed by the arrangement place of the sub-block, an irregular element of $T_{r/w}$ has to be added to the overhead time. This complicates the estimation of the maximum value taken for the time taken for a scan of one time and further complicates the design of the multimedia server.

As the present invention sets out to resolve the aforementioned problems, it is the object of the present invention to provide a method and a device for controlling access to a disc storage device capable of providing gap and skew values for data that are constant for a plurality of the disc storage devices having a number of sectors per one track that is larger for tracks at the outer periphery than for tracks at the inner periphery even in the case of the arrangement of fixed length data.

SUMMARY OF THE INVENTION

In order to achieve the aforementioned object, according to a first aspect of the present invention, there is provided a method of controlling access to a disc storage device comprising a plurality of discs storing a plurality of sub-blocks obtained by dividing inputted data, each of a plurality of the discs being configured such that a number of sectors included at tracks in an outer section of the disc is greater than a number of sectors included at tracks in an inner section of the disc. The method comprises the step of determining information and the step of accessing the disc storage device. The determining step includes determining which discs will store each of a plurality of the sub-blocks and information comprising addresses of the sub-blocks stored on the discs, and the size of each of a plurality of the sub-blocks, in such a manner that the time required for accessing each of a plurality of the sub-blocks stored in the disc storage device becomes equal. These determinations are also made on the basis of gaps expressed by angular differences in heads and ends of items of the sub-blocks when the sub-blocks are arranged on the tracks of the discs. The step of accessing is for accessing the disc storage device on the basis of the determined information.

According to a second aspect of the present invention, there is provided a device for controlling access to a disc storage device comprising a plurality of discs storing a plurality of sub-blocks obtained by dividing inputted data, each of a plurality of the discs being configured such that a number of sectors included at tracks in an outer section of the discs is greater than a number of sectors included at tracks in an inner section of the disc. The device comprises a deciding unit and an accessing unit. The determining unit is for determining which discs will store each of a plurality of the sub-blocks and information comprising addresses of the sub-blocks stored on the discs and size of each of a plurality of the sub-blocks in such a manner that time required for accessing each of a plurality of the sub-blocks stored in the disc storage device becomes equal. The determining unit also makes these determinations on the basis of gaps expressed by angular differences between heads and ends of items of the sub-blocks when the sub-blocks are arranged on the tracks of the discs. The accessing unit is for accessing the disc storage device on the basis of the determined information.

With the above configuration, the overhead at the time of accessing data on a disc device can be reduced, the time required for reading and writing data can be fixed and input/output time can be easily estimated.

BRIEF DESCRIPTION OF THE DRAWINGS

FIG. 9 is a block diagram showing an example configuration of a multimedia server to which the device according to the present invention is applied for controlling access to a disc storage device;

FIG. 10A and FIG. 10B are views showing an example of the block map 3 of FIG. 9;

FIG. 15A and FIG. 15B are views showing the relationship of the logical sector address and the physical sector address;

DETAILED DESCRIPTION OF THE PREFERRED EMBODIMENTS

First Embodiment

FIG. 9 is a block diagram showing an example configuration of a multimedia server to which the device according to the present invention is applied for controlling access to the disc storage device.

An arrangement part (Block Allocator) 1 makes a block map (Block Map) 3 to be described later based on inputted format parameters and data from a ZBR (zone bit recording) table (ZBR table) 8. The format parameters comprise a size S of one block of data, a number n by which the data is divided and a most appropriate skew value ($\theta_{skew}$), etc.

Figure 1A:
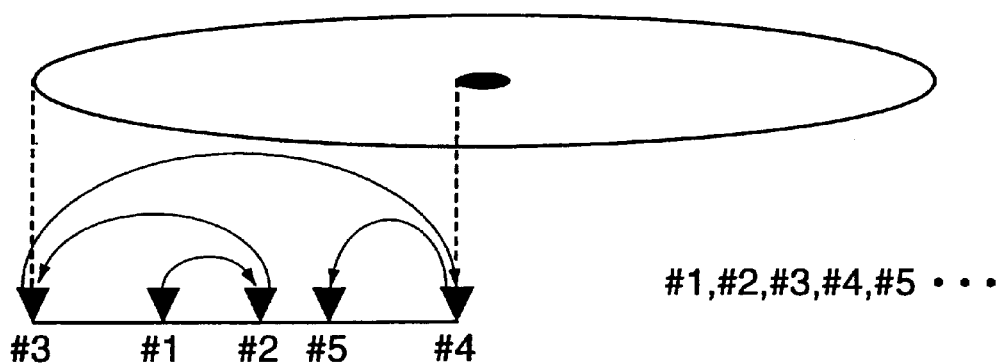
FIG. 1A and FIG. 1B are views illustrating the SCAN algorithm.
Figure 1B:
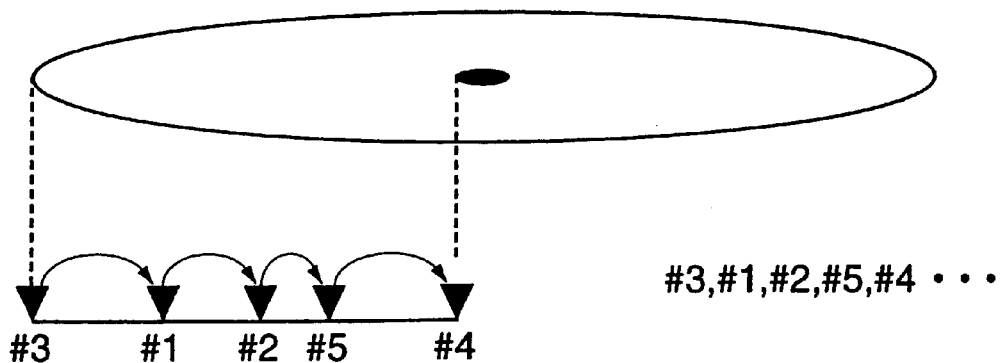
Figure 2:
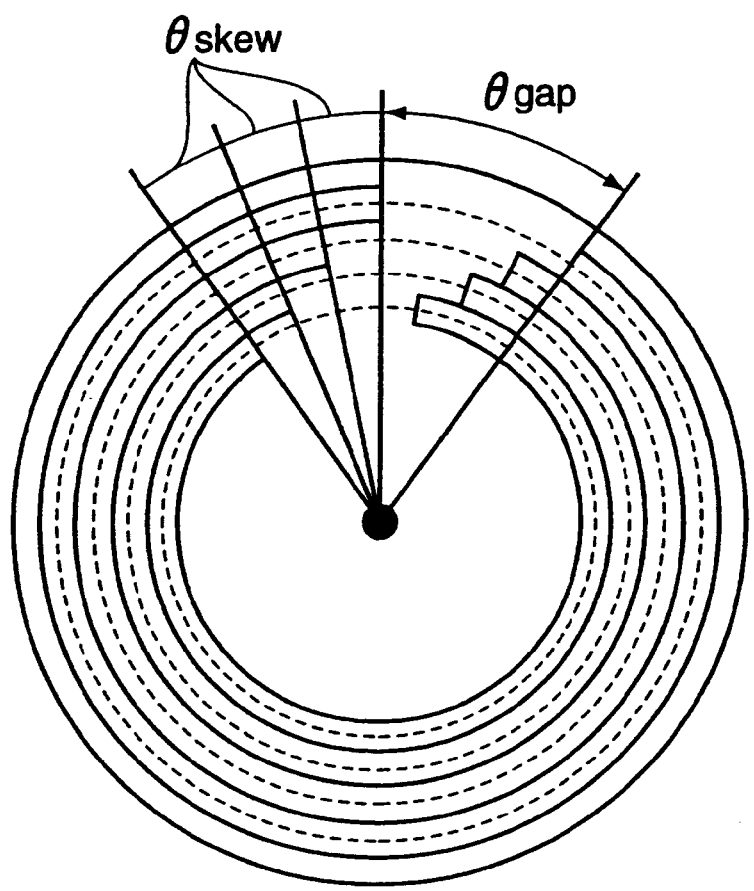
FIG. 2 is a view illustrating allocation when the skew and the gap are fixed.
Figure 3:
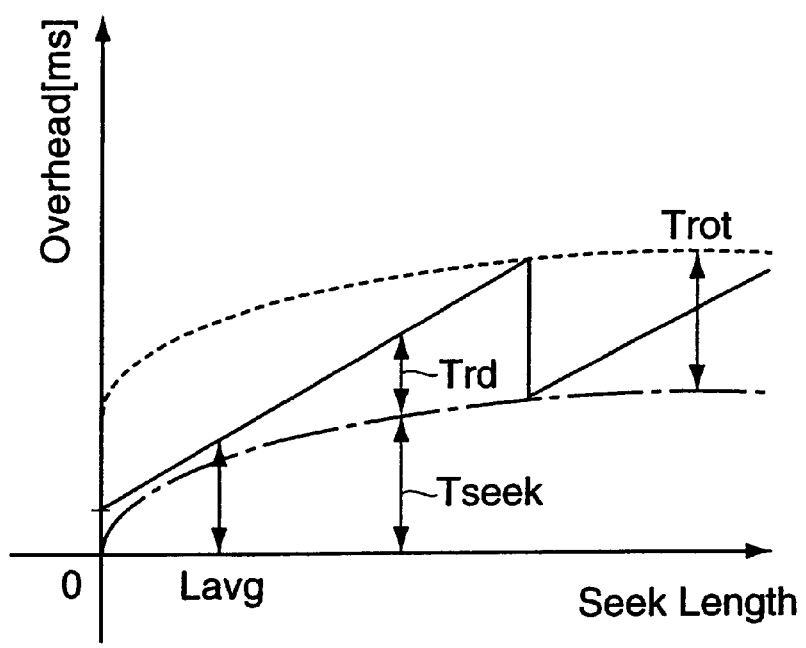
FIG. 3 is a graph showing the overhead time when the skew and the gap are fixed.
Figure 4:
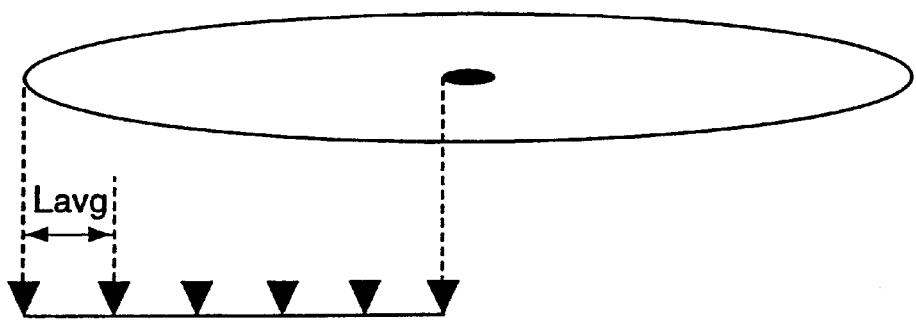
FIG. 4 is a view showing an example of an I/O request with overhead time at a maximum.
Figure 5:
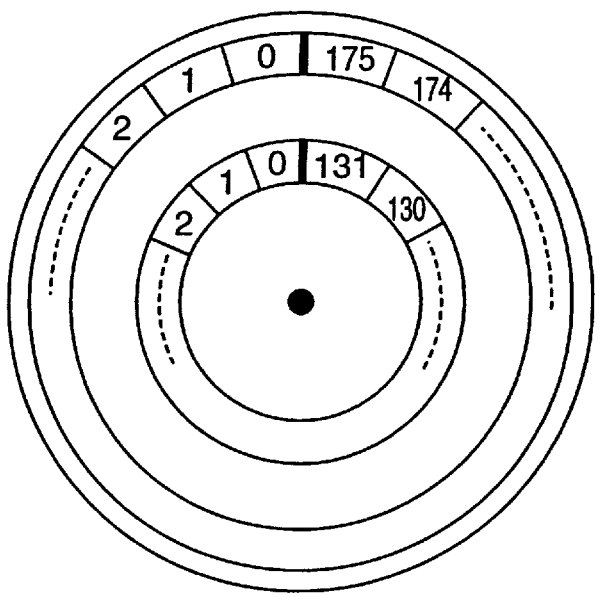
FIG. 5 is a view showing the physical sectors of a ZBR disc.
Figure 6:
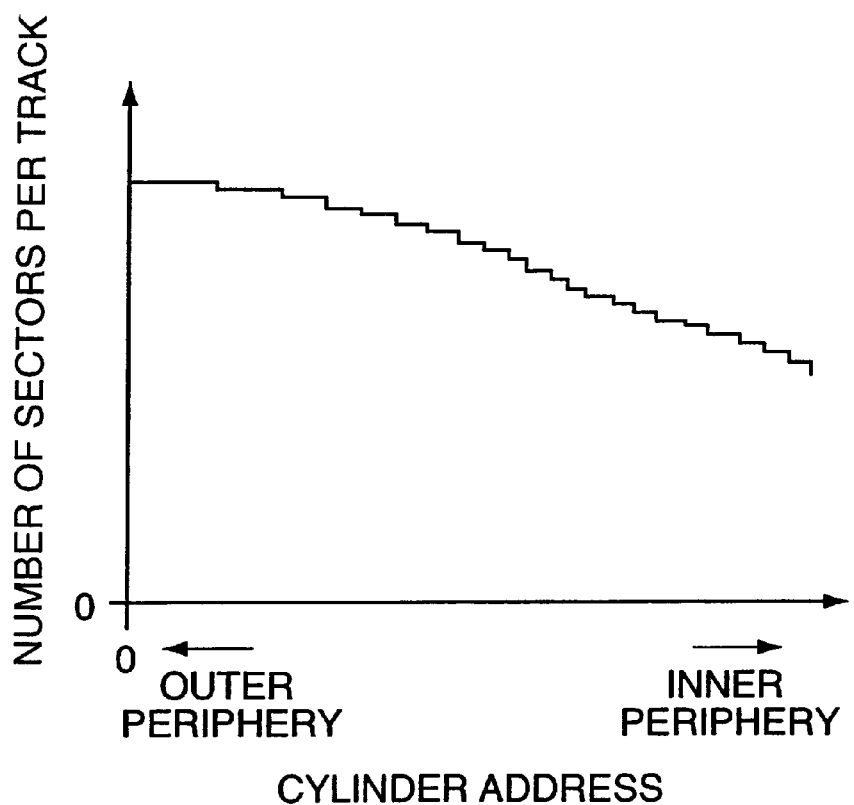
FIG. 6 is a graph showing the relationship between the number of sectors per one track of the ZBR disc.
Figure 7:
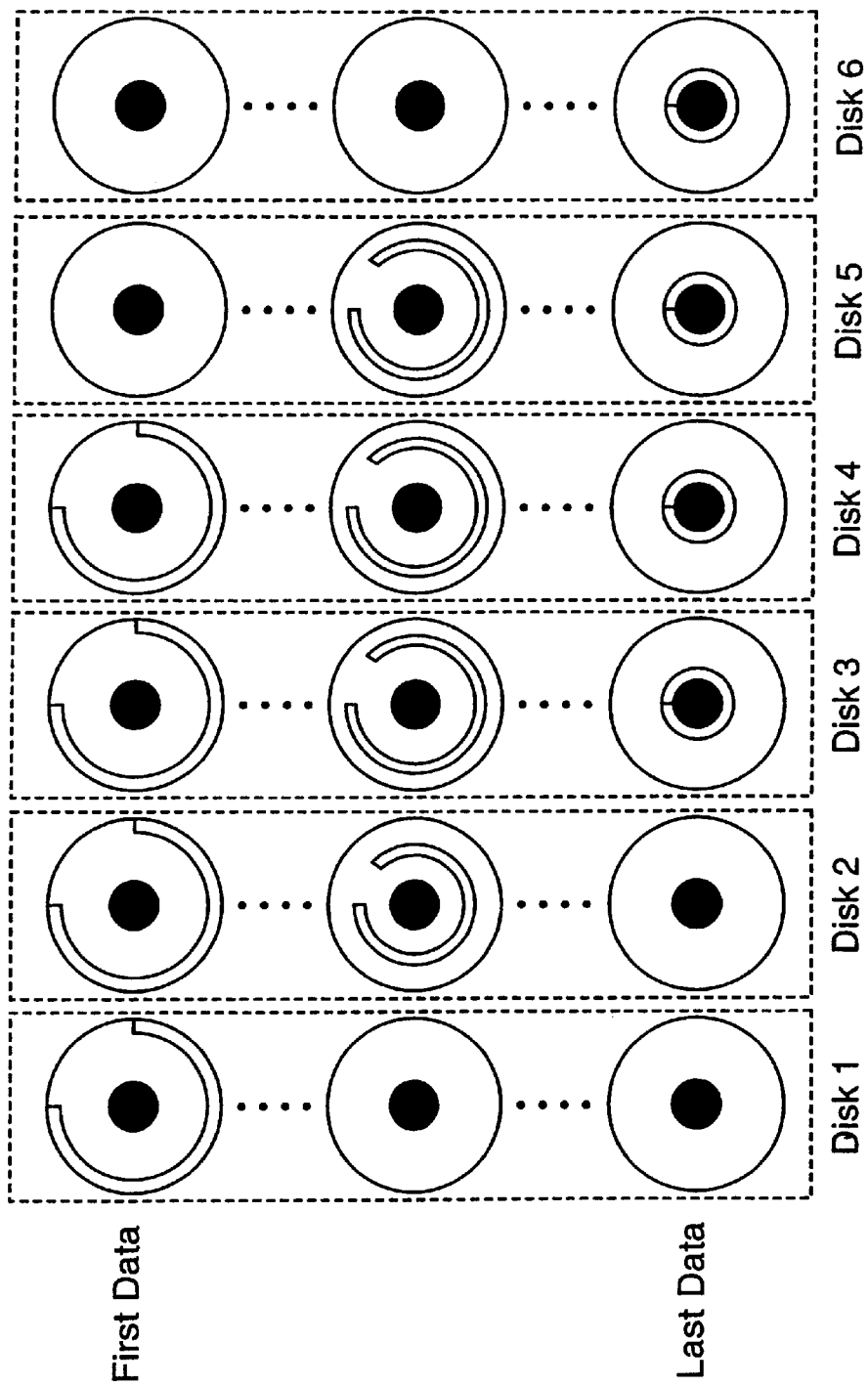
FIG. 7 is a view showing the conditions in a related method where the data is distributed across the disc storage devices.
Figure 8A:
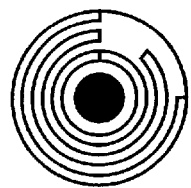
FIG. 8A, FIG. 8B and FIG. 8C are views showing the characteristics of the sub-blocks divided across disc storage devices in a related method.
Figure 8B:
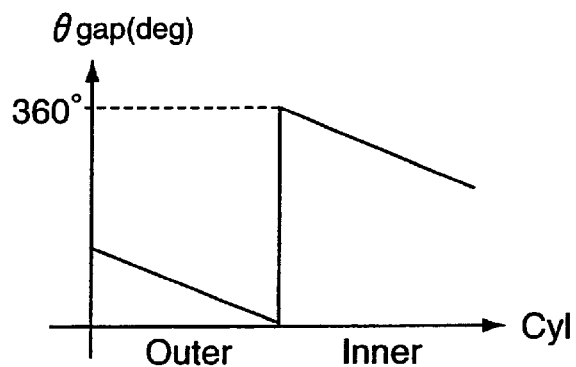
Figure 8C:
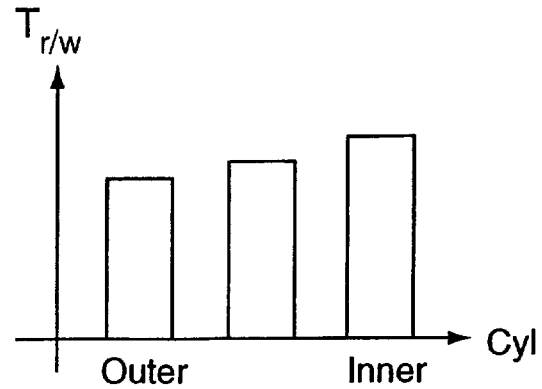

On the other hand, the ZBR table 8 is a table corresponding to the arrangement places of the data and a sector (Sector) number per one track (Track) at these places and is as shown in FIG. 6 when put in the form of a graph. The sector number for one track can then be investigated from the arrangement place of the data. In addition to this, a process is necessary for changing from physical sector addresses for disc storage devices (Disks) 6-1 to 6-m (storage means) to logical sector addresses and in this embodiment, this conversion is carried out by directly interrogating the disc storage devices 6-1 to 6-m via SCSI (ANSI Small Computer System Interface) drivers 5-1 to 5-m (reading means) to be described later. In the following, when discrimination is not necessary, the SCSI drivers 5-1 to 5-m are simply referred to as SCSI drivers 5 and the disc storage devices 6-1 to 6-m are simply referred to as disc storage devices 6.

The relationship between the logical addresses and the physical addresses of the disc storage devices 6 is described in the following with reference to FIG. 15.

The arrangement part 1 makes the block map 3 after deciding the arrangement of the data. The block map 3 is for showing where on the discs n sub-blocks obtained by dividing the kth data are stored, as shown in FIG. 10. The arrangement places for the sub-blocks are decided using the disc storage device number $D_{ki}$, start logic sector address $L_{ki}$ on the disc storage device and number of sectors $S_{ki}$ comprising the sub-blocks.

When data is read or written consecutively, access requests for a plurality of data are generated and a number for data taken as information for identifying these requests, an address on the data buffer (Data Buffer) 4 on which the data is placed, and a flag displaying reading or writing are stored at an access request buffer (Access Request Buffer) 7.

A scheduler (Scheduler) 2 reads this plurality of information from the access request buffer 7, refers to the block map 3 and investigates the arrangement places of the sub-blocks comprised by the requested data. The arrangement places comprise the disc storage device 6, the start logic sector address on the disc storage device 6, and the sector number, with the scheduler 2 carrying out an access request to the SCSI driver 5 driving the disc storage device 6. At this time, an access request for one disc storage device 6 is changed in order by the SCAN algorithm and issued.

The data buffer 4 temporarily stores inputted multimedia data and multimedia data etc. read out from the disc storage device 6.

Next, a description is given of the operation of each part when writing data to the disc storage device 6. First an access request indicating writing to the disc storage device 6 for the multimedia data to be written to the disc storage device 6 is supplied to the access request buffer 7. The scheduler 2 then reads the access request from the access request buffer 7, calculates the address of the data in the data buffer 4 at the time of reading multimedia data to be written to the disc storage device 6 from the data buffer 4 from the address of the data in the data buffer 4 included in the access request and the sector number of the sub-block read out from the block map 3. This address is then supplied to the SCSI driver 5 together with a write instruction. This is to say that in what way multimedia is divided between a plurality of sub-blocks of different sizes can be decided.

Figure 11:
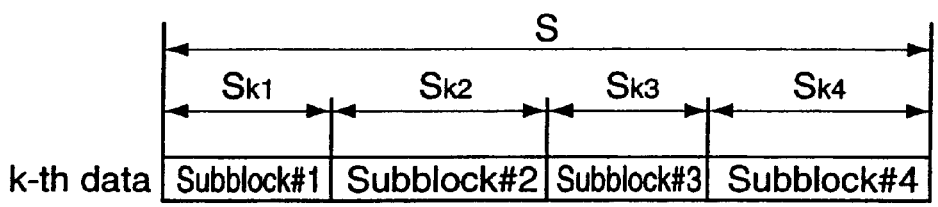
FIG. 11 is a view showing the relationship between the data blocks and the sub-blocks.
Figure 12:
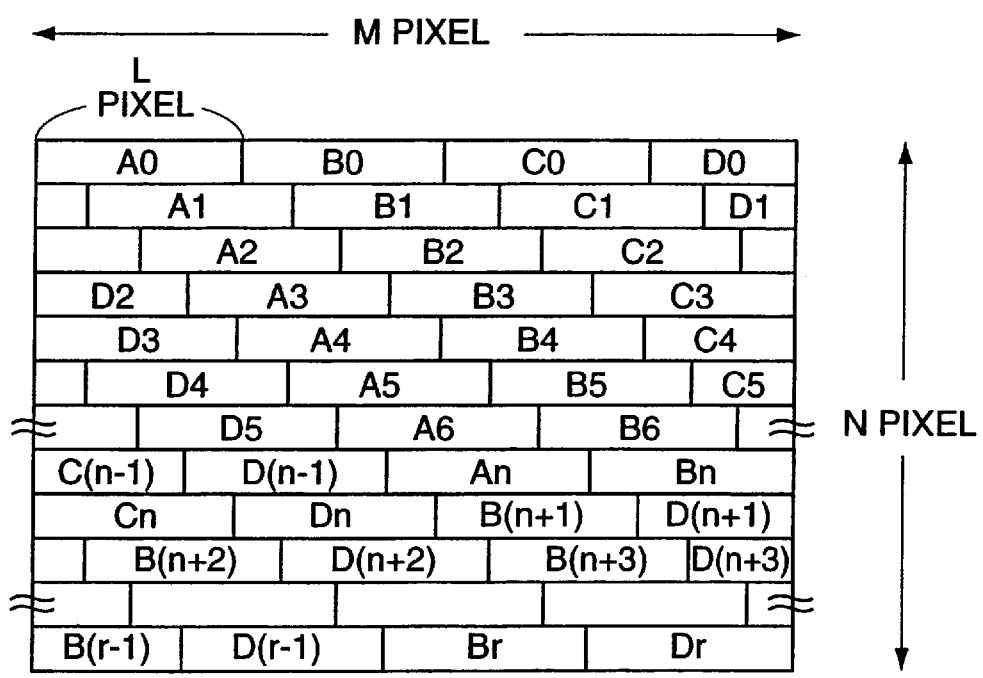
FIG. 12 is a view of data for one frame divided between a plurality of packets.
Figure 13:
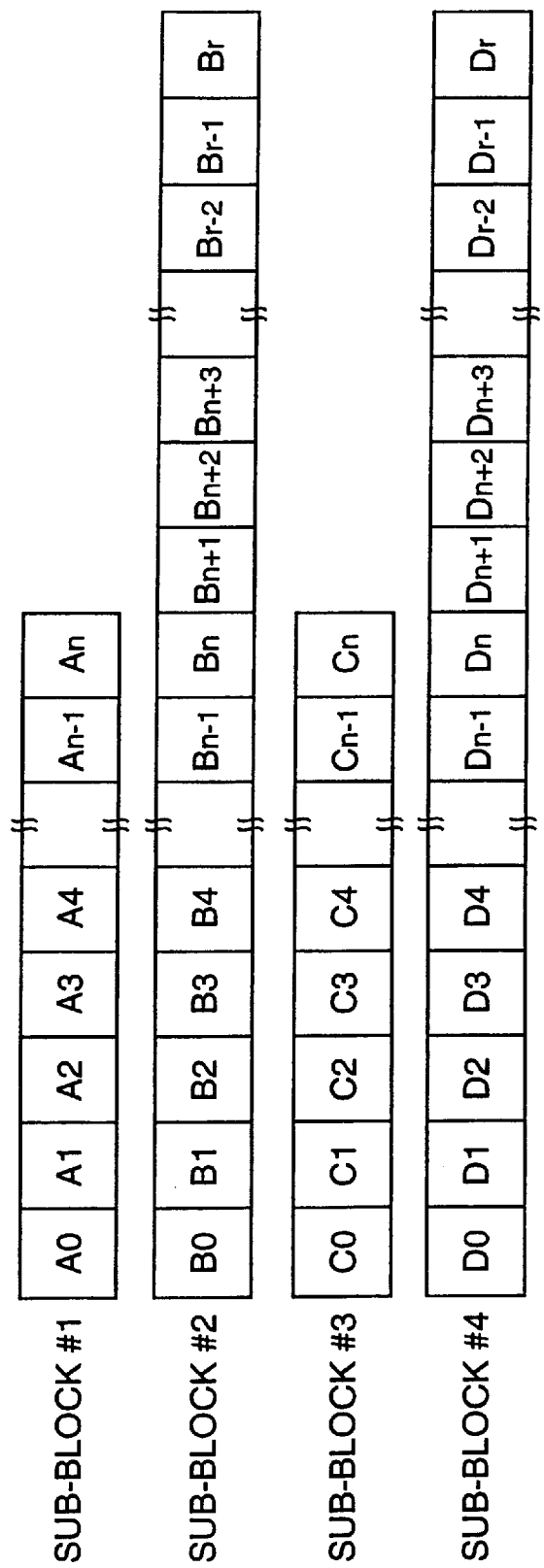
FIG. 13 is a view showing each sub-block comprising a plurality of packets.

FIG. 11 shows an example of dividing kth multimedia data between sub-blocks of different sizes. Here, multimedia data of size S is divided between a sub-block #1 of size $S_{k5}$, a sub-block #2 of Size $S_{k2}$, a sub-block #3 of size $S_{k3}$ and a sub-block #4 of size $S_{k4}$ The details of this dividing between sub-blocks will now be described. For example, when multimedia data of a size S is taken to be data for one frame, this one frame of data is divided between four sub-blocks of sizes $S_{k1}$, $S_{k2}$, $S_{k3}$ and $S_{k4}$. As shown in FIG. 12, when one frame of data comprises M×N pixels, one frame is divided between packets comprising a prescribed number of pixels (L pixels). Then, as shown in FIG. 12, each of the divided packets are allotted in order to four sub-blocks. For example, packet A0 is allotted to sub-block #1, packet B0 is allotted to sub-block #2, packet C0 is allotted to sub-block #3 and packet D4 is allotted to #4, with packet A1 being allotted to sub-block #1, packet B1 being allotted to sub-block #2, packet C1 being allotted to sub-block #3 and packet D4 being allotted to sub-block #4. In this way as shown in FIG. 13, by allotting each packet in order to each of the sub-blocks, these are allotted to sub-block #1, sub-block #2, sub-block #3 and sub-block #4.

Referring again to FIG. 9, the SCSI driver 5 reads the multimedia data from the data buffer 4 based on the address supplied by the scheduler 2 and writes each sub-block obtained by dividing the multimedia data to discs of prescribed disc storage devices 6. The sequence for the write operation is then complete as a result of this operation.

Next, a description is given of the operation of each of the parts in the case of reading data. First, an access request is stored in the access request buffer 7. The scheduler 2 then reads the access request from the access request buffer 7 and supplies this to the corresponding SCSI driver 5. The SCSI driver 5 then reads the sub-block designated by the access request from the corresponding disc storage device 6 based on the access request supplied by the scheduler 2.

The address on the data buffer 4 made to store sub-blocks read-out from the disc storage device 6 is obtained by operations of the scheduler 2 based on an address obtained from the access request buffer 7 and the sector number of the sub-block obtained from the block map 3. This address is then supplied to the corresponding SCSI driver 5 together with a read instruction. The SCSI driver 5 therefore supplies the sub-block read from the disc storage device 6 to an address calculated by the scheduler 2 of the data buffer 4 to be stored. In this way, sub-blocks that have had their order substituted by the SCAN algorithm and have been read are arranged in the original order on the data buffer 4.

Data requested by the data request c an then be completed by gathering together sub-blocks placed at the data buffer 6, outputted by the data buffer 6 in the requested order, and the desired multimedia data can be outputted in order.

Figure 14:
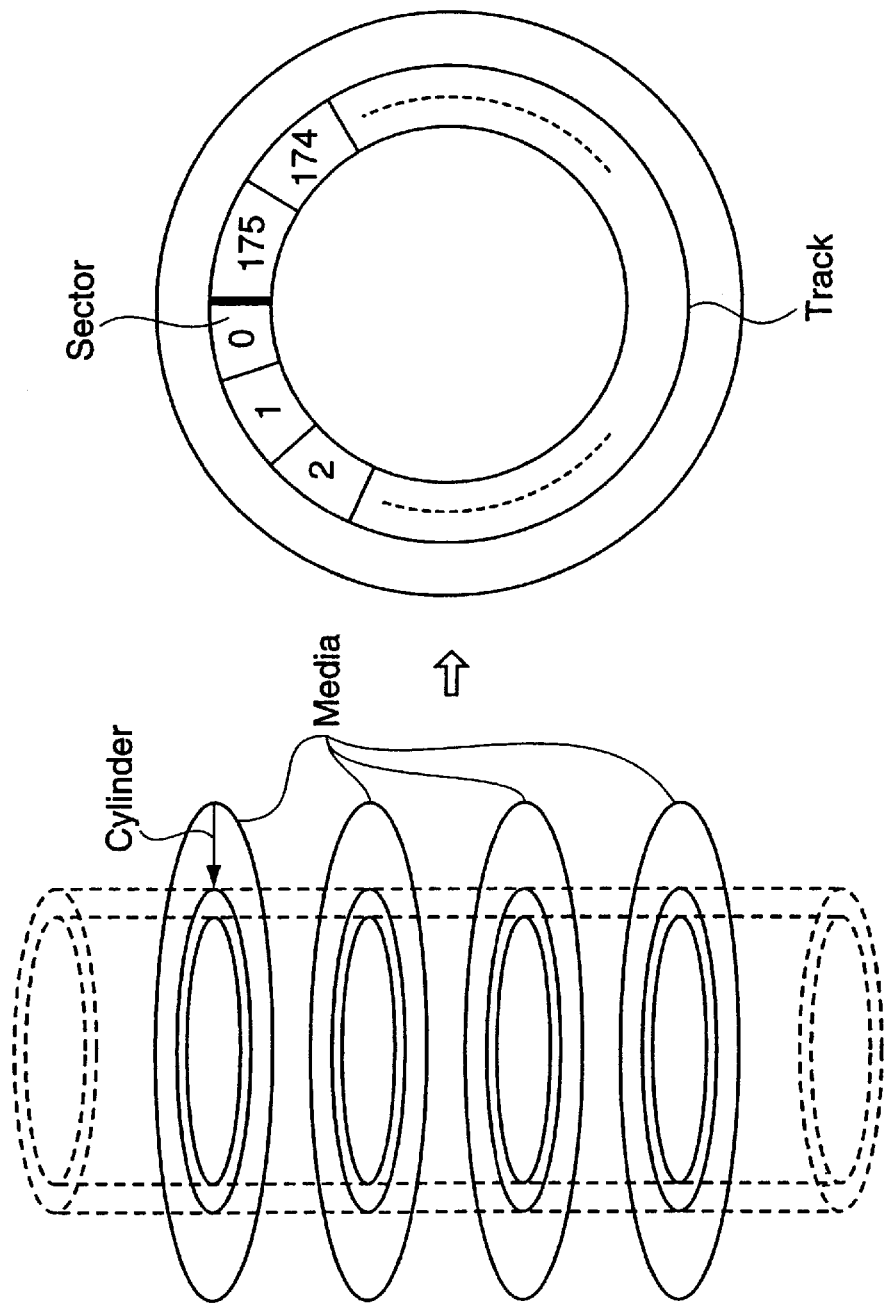
FIG. 14 is a view showing physical sectors of the disc storage device 6 of FIG. 9.

A description will now be given of the relationship between logical sector addresses and physical sector addresses of the disc storage devices 6. As shown in FIG. 14, the disc storage devices 6 can usually be accessed by each region, with each region being referred to as a sector (Sector). A sector is usually from 512 bytes to about 4 kilobytes, with donut-shaped regions lined up along the circumference being referred to as tracks (Track) and regions of tracks present at equal distances from the center of a recording medium (Media) having a plurality of overlaid layers gathered together into cylindrical shaped regions being referred to as cylinders (Cylinder). The physical address is then an address comprising the cylinder number, medium number and sector number.

On the other hand, in recent years, with drives of the SCSI specification that has become the most widespread, consecutive numbers are given to all of the sectors within the drive, with these consecutive numbers then being used to access data.

Conversion between the physical sector addresses and logical sector addresses can then be achieved by the arrangement part 1 directly interrogating the disc storage device 6 via the SCSI driver 5. Of course, even if a different method is used, a corresponding table for the physical sector addresses and the logical sector addresses can be prepared as shown in FIG. 15 and conversion between the logical sector addresses and the physical sector addresses can be carried out. As shown in FIG. 15A, the logical sector address (Logical Sector) $L_{ki}$ corresponds to a physical sector address comprising a cylinder number (Cylinder) $CYL_{ki}$, a medium number (Medium) $MED_{ki}$ and a sector number (Sector) $SEC_{ki}$, with a specific example of this being shown in FIG. 15B. A logical address can then be changed to a physical address, or a physical address can be changed to a logical address using this correspondence table.

Next, the processing procedure for the case of the arrangement part 1 arranging a kth item of data at a prescribed place of the disc storage device 6 is described with reference to the flowcharts of FIG. 16 to FIG. 21.

First, in step S1, n disc storage devices 6 for storing data are selected from a total of m disc storage devices 6. In this example, the data are divided so as to be taken as n sub-blocks, with these sub-blocks being divided into a group arranged from the outer periphery and a group arranged from the inner periphery. When the numbers 1 to n are given to each of the sub-blocks, odd-numbered sub-blocks are arranged from the outer periphery and even-numbered sub-blocks are arranged from the inner periphery. Further, the disc storage devices 6 on which the data are arranged are selected so as to be shifted so that sub-blocks do not accumulate around a small number of disc storage devices 6.

Figure 17:
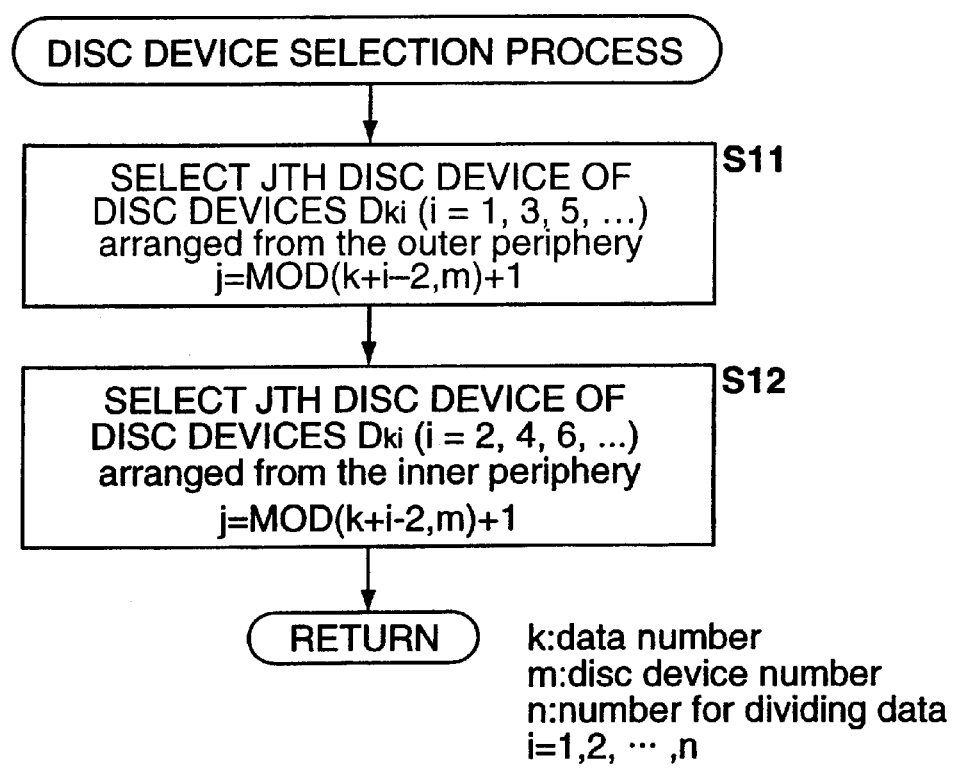
FIG. 17 is a flowchart illustrating the detailed processing sequence for step S1 of FIG. 16.

FIG. 17 is a flowchart showing the details of this process. Namely, in step S11, the jth disc storage device 6-i expressed by equation (1) is selected as a disc storage device 6-i (i=1, 3, 5, . . . ) arranged from the outer periphery.

$$j = MOD(k+i-2, m)+1 \quad \text{(equation 1)}$$

Here, MOD is an operator for calculating the remainder from dividing k+i–2 by m (total number of disc storage devices).

Next, step S12 is proceeded to and the jth disc storage device 6-i expressed by the following equation (2) is selected as the disc storage device 6-i (i=2, 4, 6, . . . ) arranged from the inner periphery.

$$j = MOD(k+i-2, m)+1 \quad \text{(equation 2)}$$

Here, MOD is the operator for calculating the remainder from dividing k+i–2 by m.

As shown in the flowchart in FIG. 17, it has been decided for sub-blocks arranged at the outer periphery and sub-blocks arranged at the inner periphery to be exchangeable but if a balance can be reached this does not have to be the case. Namely, all of the disc storage devices 6 from the outer periphery are selected, with the disc storage devices 6 from the inner periphery then being selected.

Further, if the sub-blocks are not concentrated around a small number of disc storage devices 6, it does not matter even if the jth disc storage device 6 expressed by equation (1) and equation (2) is not selected. For example, it is effective if a method is employed where disc storage devices 6 that do not use the outer periphery very much are selected with regards to the disc storage devices arranging sub-blocks from the outer periphery and disc storage devices 6 that do not use the inner periphery a great deal are selected with regards to disc storage devices arranging sub-blocks from the inner periphery.

Figure 16:
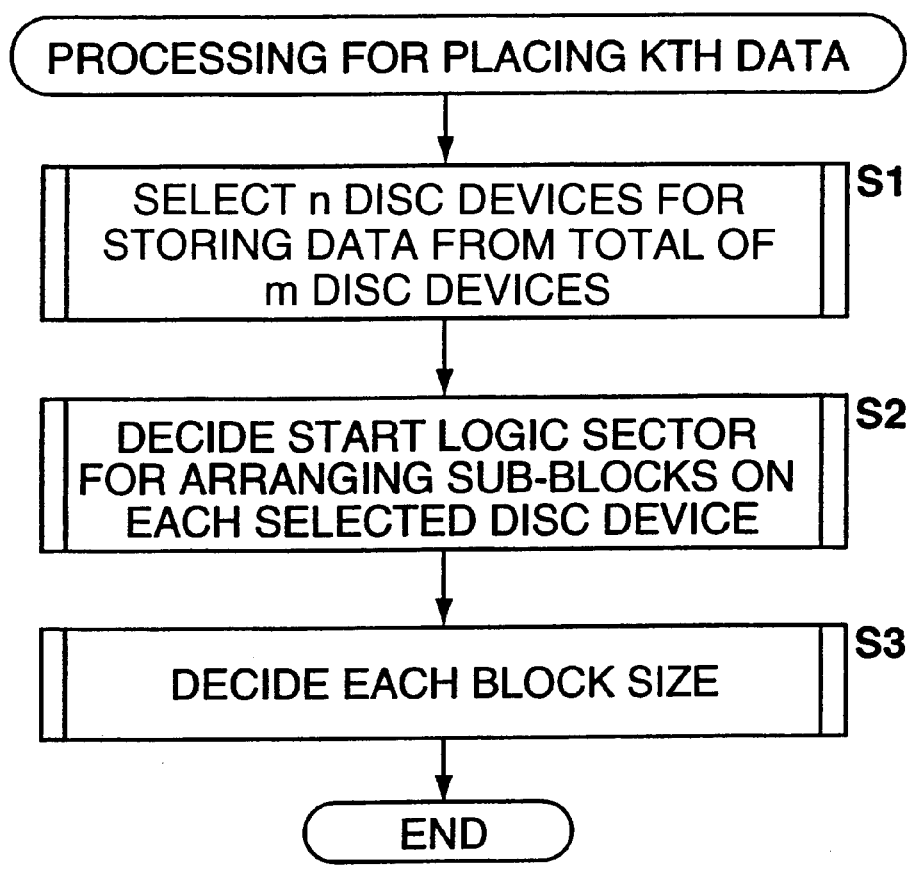
FIG. 16 is a flowchart illustrating the processing order for deciding the place of arrangement of the kth item of data.

The disc storage device 6 is decided and step S2 of FIG. 16 is then proceeded to.

In step S2, start logic sectors that arrange sub-blocks are decided for each of the selected disc storage devices 6.

Figure 18:
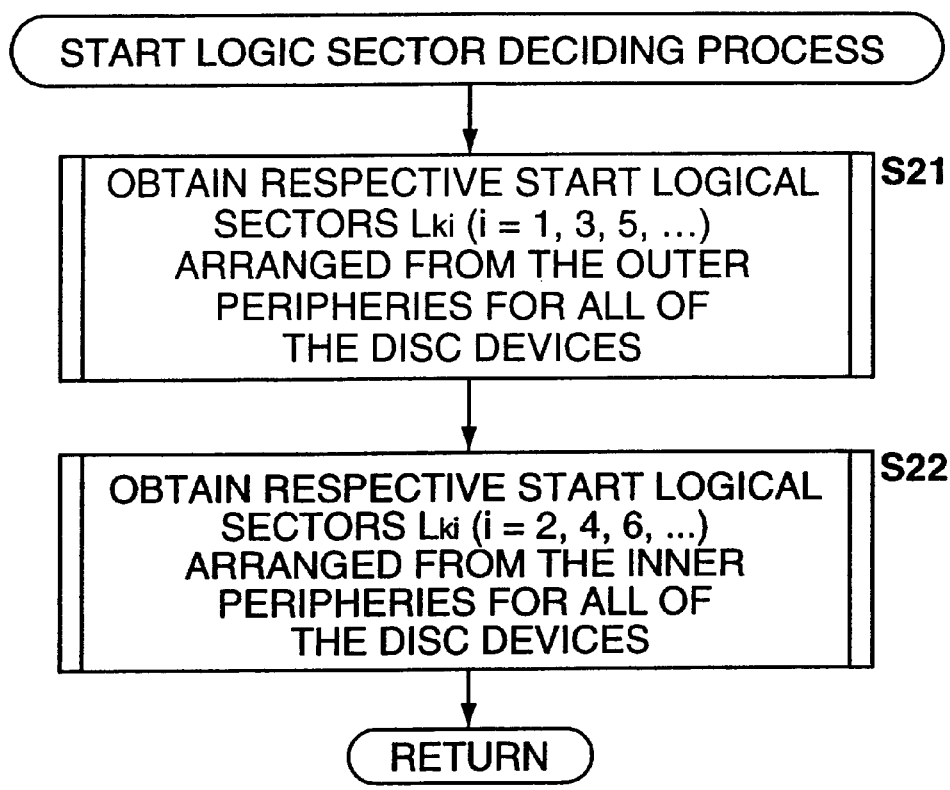
FIG. 18 is a flowchart illustrating the detailed processing procedure for step S2 of FIG. 16.

FIG. 18 is a flowchart showing the processing sequence for deciding these start logic sectors. First, in step S21, the respective start logic sector addresses $L_{ki}$ (i=1, 3, 5, . . . ) are obtained for all of the disc storage devices 6 arranged from the outer periphery.

Figure 19:
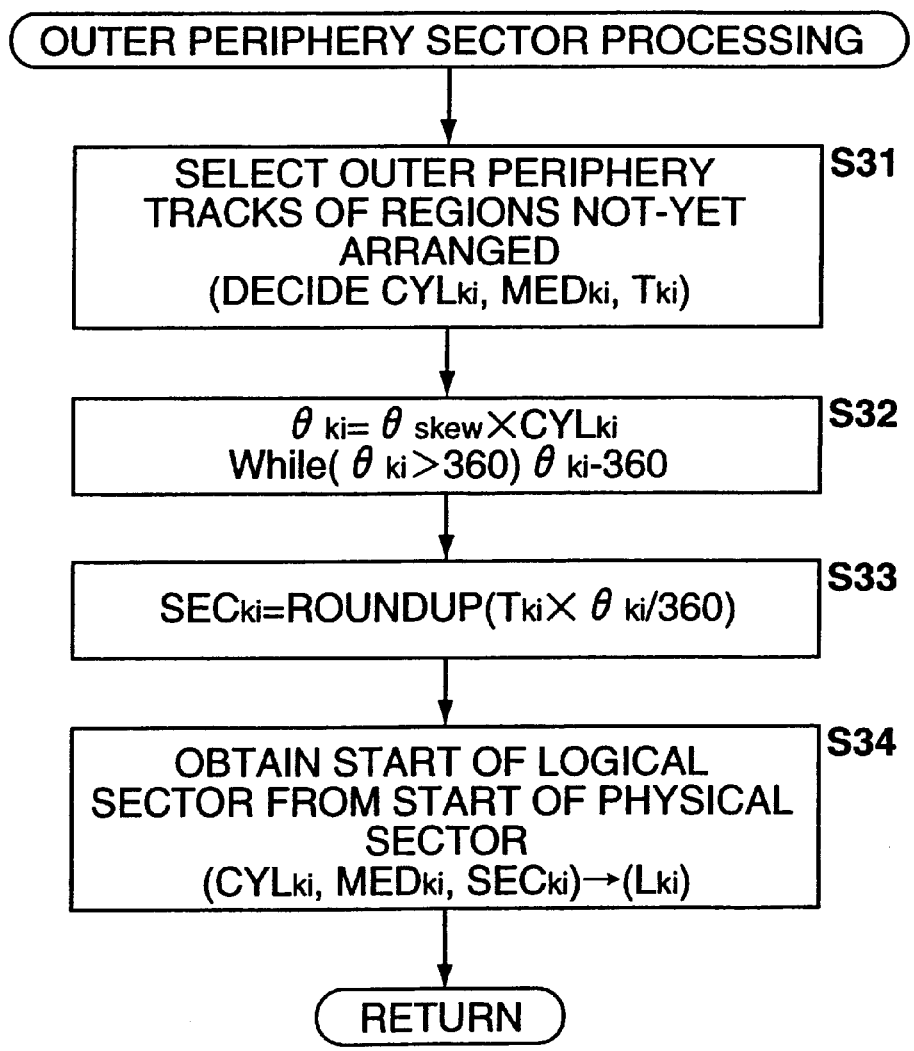
FIG. 19 is a flowchart illustrating the detailed processing procedure for step S21 of FIG. 18.

FIG. 19 is a flowchart showing the details of the process occurring in step S21 of FIG. 18. First, in step S31, the outermost track within a region for which sub-blocks have not yet been arranged is selected as a track for arranging sub-blocks. In this way, the cylinder number ($CYL_{ki}$) of the physical sector address and the media number ($MED_{ki}$) are decided, the ZBR table 8 is referred to, and the sector numbers ($T_{ki}$) per each one track occurring at the arrangement places can be understood.

Next, in step S32, the angle $\theta_{ki}$ between the head of the track selected in step S31 and the head of the outermost track is obtained from the cylinder number ($CYL_{ki}$) and the most appropriate skew ($\theta_{skew}$) value using equation (3).

$$\theta_{ki} = \theta_{skew} \times CYL_{ki} \quad \text{(equation 3)}$$

Here, when $\theta_{ki} > 360$, $\theta_{ki} = \theta_{ki} - 360$ is repeated until $\theta_{ki} \leq 360$.

Next, step S33 is proceeded to and the sector number ($SEC_{ki}$) is obtained using equation (4) from the angle $\theta_{ki}$ obtained in equation (3) and the sector number ($T_{ki}$) per track.

$$SEC_{ki} = T_{ki} \times \theta_{ki} / 360 \quad \text{(equation 4)}$$

Next, in step S34, a logical sector address ($L_{ki}$) is decided from the physical sector address ($CYL_{ki}$, $MED_{ki}$, $SEC_{ki}$) obtained in steps S31 to S33 and the process returns.

Step S22 is then proceeded to and respective start logic sector addresses $L_{ki}$ (i=2, 4, 6, . . . ) are obtained for all of the disc storage devices arranged from the inner periphery.

Figure 20:
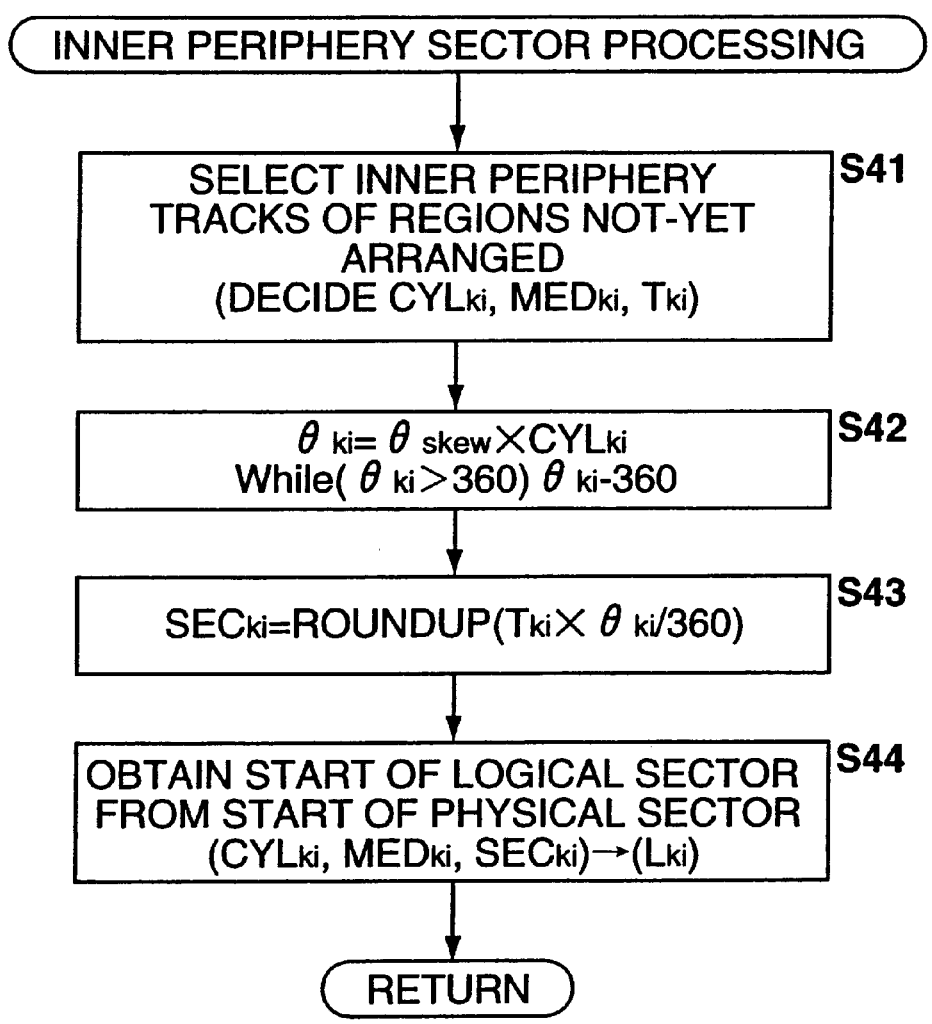
FIG. 20 is a flowchart illustrating the detailed processing procedure for step S22 of FIG. 18.

FIG. 20 is a flowchart showing the details of the process occurring in step S22 of FIG. 18. First, in step S41, the innermost track from the center of the not-yet arranged region is selected as the track to which sub-blocks are to be arranged. In this way, the cylinder number ($CYL_{ki}$) of the physical sector address and media number ($MED_{ki}$) are decided, the ZBR table is referred to and the sector numbers ($T_{ki}$) per each one track occurring at this arrangement position can be known.

Next, in step S42, the angle $\theta_{ki}$ between the head of the track selected in step S41 and the head of the outermost track is obtained, with the sector number ($SEC_{ki}$) then being obtained in step S43. Then, in step S44, the logical sector address ($L_{ki}$) is decided from the obtained physical sector address ($CYL_{ki}$, $MED_{ki}$, $SEC_{ki}$). A detailed description of the process occurring in the aforementioned steps S42 to S44 is omitted here as this is the same as the process occurring in steps S32 to S34 of FIG. 19.

In the processing example shown in FIG. 18 to FIG. 20, tracks to be arranged with sub-tracks are selected from the outermost track within yet to be arranged regions when sub-blocks are arranged from tracks of the outer periphery and tracks to be arranged with sub-blocks are selected from the innermost tracks within regions yet to be arranged when sub-blocks are arranged at tracks from the inner periphery, but it is not always necessary to select the outermost track or innermost track. For example, in the format for the ZBR method, if the zone is the same, the number of sectors per track is the same and the size of each sub-block and gap value therefore do not change.

When the start logic sector address is obtained, step S3 of FIG. 16 is proceeded to and the size of each sub-block is decided. The processing sequence for deciding the sizes of the sub-blocks is described later with reference to the flowchart of FIG. 21.

Next, what size (number of sectors) should be adopted for each of the sub-blocks is considered. First, the sum of each sub-block size is made equal to the size of the original data. Namely, when the size (number of sectors) of each sub-block is taken to be $S_{ki}$ (i=1, 2, 3, . . . , n) and the original data size (number of sectors) is taken to be S, this is expressed by the following equation (5).

$$S_{k1} + S_{k2} + \ldots , + S_{kn} = S \quad \text{(equation 5)}$$

On the other hand, the following equation has to be fulfilled for the gap value for each sub-block to be equal.

$$S_{k1}/T_{k1} = S_{k2}/T_{k2} = , \ldots , = S_{kn}/T_{kn} \quad \text{(equation 6)}.$$

In equation (6) above, $T_{ki}$ (i=1, 2, 3, . . . , n) is the number of sectors of the track at which the ith sub-block is arranged.

The number of sectors $S_{ki}$ for each sub-block can then be given using the following equation (7) from equation (5) and equation (6).

$$S_{ki} = S \times T_{ki}/T \quad \text{(equation 7)}$$

where T is taken to be $= T_{k1} + T_{k2} +, \ldots , + T_{kn}$.

In reality, as the number of sectors $S_{ki}$ is given by an integer, a number of fine adjustments are necessary for each size.

Figure 21:
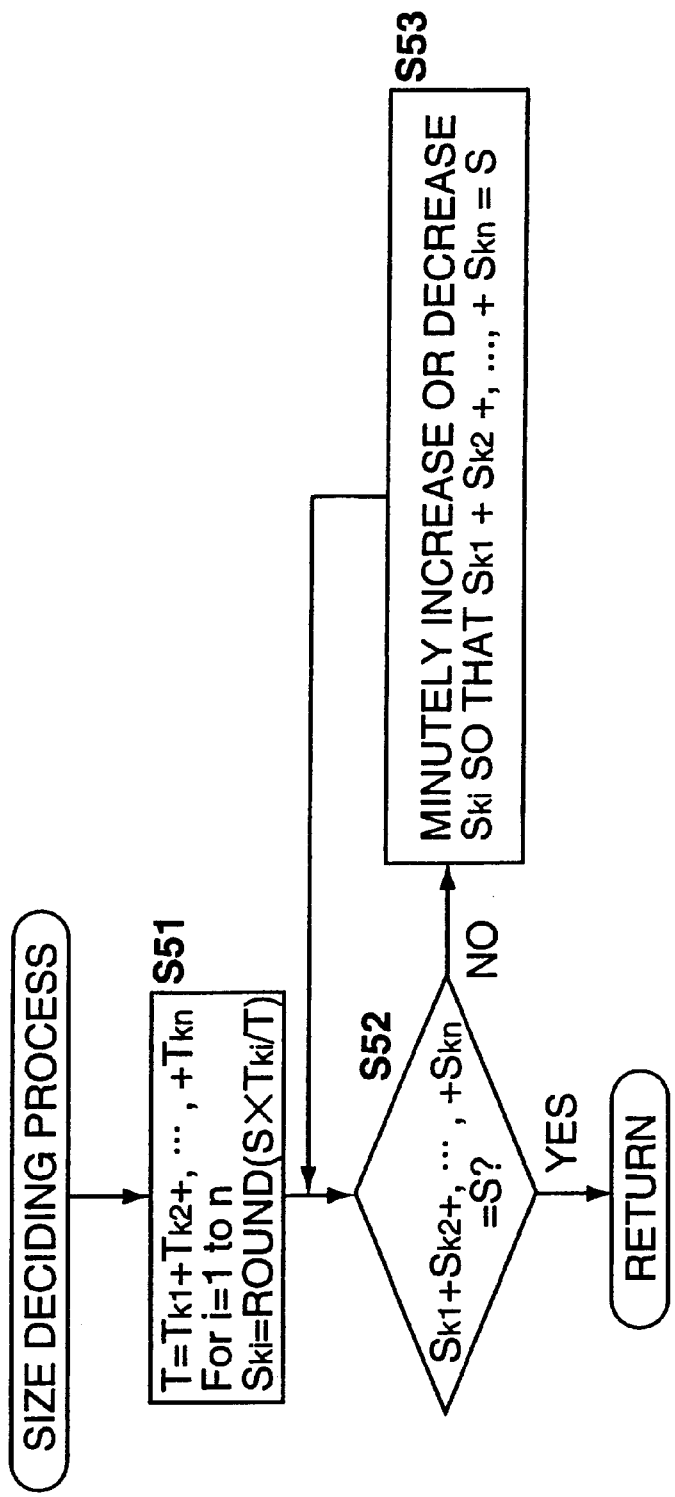
FIG. 21 is a flowchart illustrating the detailed processing procedure for step S3 of FIG. 16.

A flowchart for achieving the above procedure is shown in FIG. 21. First, in step S51, the sum T of the number of sectors $T_{ki}$ per track of the tracks corresponding to the arrangement place for the sub-blocks to be arranged is obtained. Next, the calculation expressed by equation (7) above is carried out for a variable i of values 1 to n so that each sub-block size Ski (i=1, 2, . . . , n) is obtained.

Next, step S52 is proceeded to and a determination is made as to whether or not the sum of the sizes $S_{ki}$ for each sub-block obtained in step S51 is equal to the size S of the original data by carrying out calculation expressed by the above equation (5). When it is determined that the sum of the size $S_{ki}$ of each sub-block is not equal to the size S of the original data, step S53 is proceeded to and the size $S_{ki}$ of each sub-block is increased or decreased slightly so that the sum of the size $S_{ki}$ of each sub-block becomes equal to the size S of the original data. Step S52 is then returned to, with the process of step S52 and S53 then being repeated until it is determined that the sum of the sizes $S_{ki}$ of each of the sub-blocks is equal to the size S of the original data.

On the other hand, when it is determined in step S52 that the sum of the sizes $S_{ki}$ of each of the sub-blocks is equal to the size S of the original data, the process ends and then returns. In this way, the process of step S3 of the flowchart shown in FIG. 16 is complete, with all of the processing therefore being complete.

Figure 22:
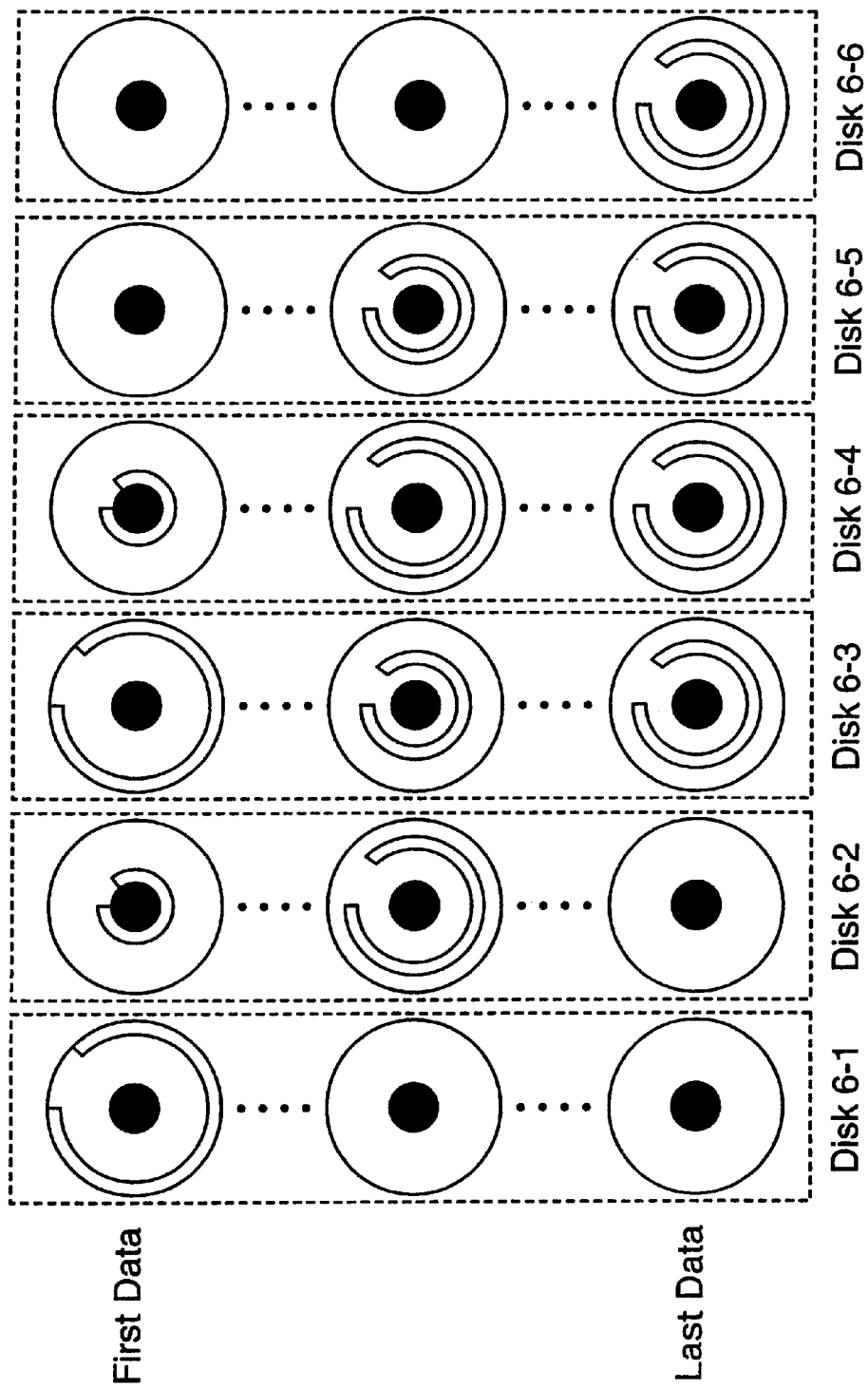
FIG. 22 is a view showing an example of storing data so as to be divided across a plurality of disc storage devices 6.

FIG. 22 shows an example of the disc storage devices 6 divided into sub-blocks. Here, the number of disc storage devices 6 is taken to be 6 and the number of sub-blocks is taken to be 4. The first item of data is then arranged so as to be divided between disc storage devices 6-1 to 6-4. The sub-blocks arranged at the disc storage devices 6-1 and 6-3 are introduced to the outermost track and the sub-blocks arranged at disc storage devices 6-2 and 6-4 are introduced to the innermost tracks. Further, the second item of data is introduced to the disc storage devices 6-2 to 6-5 in the order of outer, inner, outer, inner, and the third item of data is introduced to the disc storage devices 6-3 to 6-6 in the order of outer, inner, outer, inner. Data are then provided similarly thereafter, with, for example, the final data then being arranged in more or less the middle of the cylinder of disc storage devices 6-3 to 6-6.

Figure 23A:
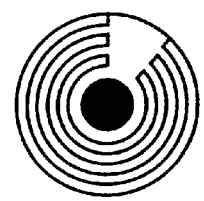
FIG. 23A, FIG. 23B and FIG. 23C are views illustrating the characteristics of the disc storage device 6 divided into sub-blocks.
Figure 23B:
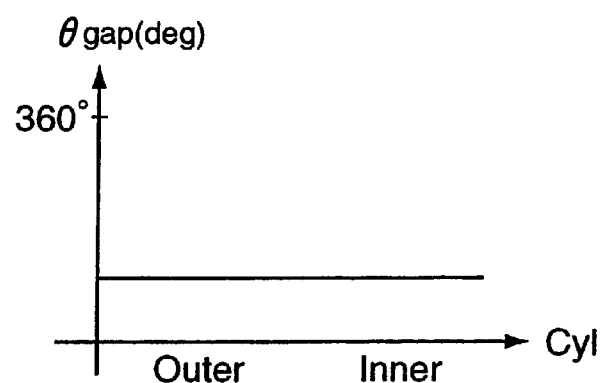
Figure 23C:
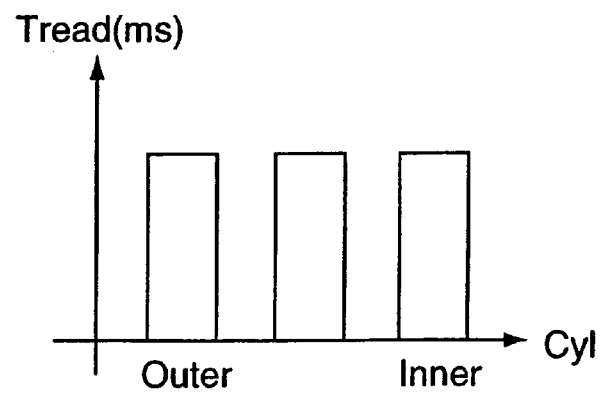

When sub-blocks arranged in this way are viewed paying attention to one disc storage device 6, as shown in FIG. 23A and FIG. 23B, the gap value for each sub-block is almost the same and as shown in FIG. 23C, the time $T_{read}$ required to read each sub-block is also almost fixed. Therefore, when the sub-blocks are arranged, when the most appropriate skew ($\theta_{skew}$) value is given, the rotation wait time is suppressed and the maximum value for the overhead time is made small.

A method of constructing a VOD (Video on Demand) server for the case of using a ZBR formatted disc storage device is disclosed in U.S. Pat. No. 5,510,905. In this application, data of the same size obtained by dividing an image data stream are arranged so as to be divided between two pairs of tracks, with the data transmission rate at the time of playback being kept almost fixed by dividing the sizes occurring at each respective track in proportion to the number of sector numbers per track.

However, the above embodiment is a data arrangement method for resolving the above problems by shortening the rotation wait time even for ZBR formatted disc storage devices, which is different from the problems resolved by U.S. Pat. No. 5,510,905. Further, whereas in U.S. Pat. No. 5,510,905 the tracks at which data was provided was limited to two pairs, in the above embodiment, a method of configuring a flexible system is provided that is capable of arranging data to more than two pairs of tracks if necessary.

In the above embodiment, the skew and gaps for sub-blocks on the same disc storage devices 6 can be fixed values. It is therefore possible to reduce the overhead time for the disc storage device, i.e., the sum of the seek time and the rotation wait time, by using this invention in combination with the SCAN algorithm.

The time for actually reading or writing to a sub-block while the heads of the disc storage devices 6 are passing over the tracks on which the sub-blocks are stored also becomes uniform for each sub-block and it therefore becomes easy to estimate the overall maximum value of the I/O time. Further, this estimated maximum value is also smaller and more reliable than that of the related art.

In the above embodiment, a description has been given for the case where control or reading and writing of data to or from the disc storage device 6 is executed using a dedicated controller but control of reading and writing of data to and from the disc storage device 6 can also be carried out by causing control software for these controllers to operate at a CPU such as a host computer etc.

In the above embodiment, scanning was carried out in a direction from the outer periphery to the inner periphery when data was accessed but scanning from the inner periphery to the outer periphery is also possible. In this case, the most appropriate skew at the time of accessing data is set while the head is being moved from the inner periphery to the outer periphery.

Further, in the above embodiment, a hard disc was used as a medium for recording data but other recording media such as an optical disc or magneto-optical disc, etc., can also be used.

According to the method and the device of the present invention for controlling access to the disc device, overhead at the time of accessing data on the disc storage device can be reduced. Further, the time necessary for reading and writing data to and from the disc storage devices can be fixed and the I/O time can therefore be easily estimated.

What is claimed is:

1. A method of controlling access to one or more disc storage devices comprising a plurality of discs, the discs being configured such that a number of sectors included at tracks in an outer section of each of said discs is greater than a number of sectors included at tracks in an inner section of said discs, said method comprising the steps of:

inputting a data block;

determining how to divide the data into a plurality of associated sub-blocks and write the sub-blocks on one or more disc storage devices in such a manner that a first time required for accessing a first sub-block is equal or nearly equal to a second time required for accessing any other associated sub-block; and accessing one or more disc storage devices on the basis of the determining step; and wherein the determining step comprises:

determining a size of each sub-block;

dividing the data block into sub-blocks, each of which has a header and an end, according to the sizes determined in the size determining step;

determining an address for storing each sub-block; and writing each sub-block onto the corresponding address determined in the address determining step, such that each sub-block has a skew angle defined by a location at which the sub-block's header is written and a gap angle defined by an angular separation of the sub-block's header and end.

2. The method of claim 1, wherein:

a size of the data block is fixed;

a number of sub-blocks is n;

a number of disc storage devices is m;

$n \leq m$; and wherein the step of determining comprises the steps of arranging each sub-block obtained by dividing a data block on a different disc storage device; and determining a size and address for each sub-block so that the gap angle of each sub-block is fixed or almost fixed.

3. The method of claim 2, wherein:

the data block has a size of S;

each sub-block has a size of $S_i$, wherein ($1 \leq i \leq n$) and $S_1+S_2+, \ldots ,+S_n=S$;

$T_i$ is the number of sectors of a track at which an $i^{th}$ sub-block is written, wherein ($1 \leq i \leq n$); and wherein:

the step of determining a size comprises the step of determining the size of each sub-block such that $$S_1/T_1 = S_2/T_2 =, \ldots ,= S_n/T_n.$$

4. The method of claim 1, wherein the step of determining is carried out when sub-blocks are further divided into a group arranged on tracks in an outer section of each disc storage device and a group arranged at tracks in an inner section of each disc storage device, cylinder addresses corresponding to the tracks on which the sub-blocks are written and the size of the sub-blocks are made to be the same or almost the same for each group.

5. The method of claim 4, wherein:

the number of sub-blocks divided from the same data block is n;

the number of sub-blocks arranged on tracks in the outer section of the disc storage device is $n_o$;

the number of sub-blocks arranged on tracks in the inner section is taken to be $n_i$;

$n_o+n_i=n$;

a number of disc storage devices equals m; and wherein the step of determining an address comprises the steps of:

selecting $n_o$ disc storage devices for arranging the sub-blocks on tracks in the outer section; and selecting $n_i$ disc storage devices from the remaining ($m-n_o$) disc storage devices for arranging the sub-blocks on tracks in the inner section in such a manner that the sub-blocks are not concentrated at the outer section or inner section of the discs on which the sub-blocks are written.

6. The method of claim 5, wherein:

the total number of cylinders for each disc storage device is L, with cylinder numbers 1 to L assigned from the outer periphery to the inner periphery;

of the cylinders of a $j^{th}$ ($1 \leq j \leq m$) disc storage device not recorded with sub-blocks, the cylinder on the outermost periphery is taken to be $M_o(j)$ and the cylinder at the innermost periphery is taken to be $M_i(j) (1 \leq M_o(j) \leq M_i(j) \leq L)$; and wherein the step of determining an address comprises the steps of:

selecting $n_o$ disc storage devices with small $M_o(j)$ in order from the total of m disc storage devices for arranging the sub-blocks at the track in the outer section; and selecting $n_i$ disc storage devices with large $M_i(j)$ in order from ($m-n_o$) of said disc storage devices for arranging the sub-blocks at the tracks in the inner section.

7. The method of claim 5, wherein:

addresses of sub-blocks arranged on tracks in the outer section of the disc storage devices are taken to be addresses corresponding to tracks which are, of tracks not recorded with sub-blocks, at the outermost section of the disc storage devices, and addresses of sub-blocks arranged at tracks in the inner section of the disc storage devices are taken to be addresses corresponding to tracks which are, of tracks not recorded with sub-blocks, at the innermost section of the disc storage devices.

8. The method of claim 5, wherein:

a total number of cylinders on the disc storage devices capable of storing the sub-blocks equals L;

each cylinder is assigned a number in order from an outer periphery to an inner Periphery of the disc storage device;

the number of the cylinder at the outer periphery containing sub-blocks is $L_o$; and the number of the cylinder at the inner periphery of said disc containing sub-blocks is $L_i$; and wherein:

the dividing step comprises dividing the data blocks into an even number of sub-blocks; and the step of determining an address comprises the steps of:

determining that n/2 sub-blocks will be arranged at tracks in the outer section of the disc storage devices;

determining that n/2 sub-blocks will be arranged at tracks in the inner section of said disc storage devices; and determining that each sub-block will be arranged on the cylinders so that the values of $L_o$ and $L_i$ satisfy or nearly satisfy the equation $$L_o+L_i=L+1.$$

9. The method of claim 4, wherein:

the number of sub-blocks divided from the same data block is n;

the number of sub-blocks arranged at tracks in the outer section of the disc is $n_o$;

the number of sub-blocks arranged at tracks in the inner section is $n_i$;

$n_o+n_i=n$;

a number of disc storage devices equals m; and wherein the step of determining an address comprises the steps of:

selecting $n_i$ disc storage devices from a total of m disc storage devices for arranging the sub-blocks at tracks in the outer section;

selecting $n_o$ disc storage devices from remaining ($m-n_i$) disc storage devices for arranging the sub-blocks at tracks in the outer section in such a manner that the sub-blocks are not concentrated at the outer periphery or inner periphery of the selected disc storage devices.

10. The method of claim 9, wherein the total number of cylinders capable of storing the sub-blocks for each disc storage device is taken to be L, with cylinder numbers 1 to L assigned from the outer periphery to the inner periphery;

of the cylinders of a jth ($1 \leq j \leq m$) disc storage device not recorded with sub-blocks, the cylinder on the outermost periphery is taken to be $M_o(j)$ and the cylinder at the innermost periphery is taken to be $M_i(j)(1 \leq M_o(j) \leq M_i(j) \leq L)$; and wherein the step of determining an address comprises the steps of:

selecting $n_i$ disc storage devices with large $M_i(j)$ in order for arranging the sub-blocks at the tracks in the inner section; and selecting $n_o$ disc storage devices with small $M_o(j)$ in order from $(m-n_i)$ of the disc storage devices for arranging the sub-blocks at the tracks in the outer section.

11. The method of claim 4, wherein:

a data block number equals k;

a number of disc storage devices equals m;

n sub-blocks divided from arbitrary data blocks are taken to be $SB_i$ (where i is an integer of $1 \leq i \leq n$); and wherein the step of determining an address comprises the steps of:

determining that the address of $SB_i$ will be in either the outer section or inner section of the respective disc storage device on the basis of the values of i and j, where:

j=MOD(k+i−2, m)+1; and determining that $SB_i$ will be written on the jth ($1 \leq j \leq m$) disc storage device.

12. The method of claim 11, wherein step of determining an address comprises the steps of alternately assigning addresses for sub-blocks $SB_i$ in either the outer section or the inner section according to the value of i.

13. The method of claim 1, wherein the step of determining determines that the skew value between headers of sub-blocks arranged at neighboring tracks on the same disc storage device are fixed or almost fixed.

14. The method of claim 1, wherein the step of accessing further comprises the step of changing an order of accessing a plurality of sub-blocks so that an amount of movement of a head for accessing the sub-blocks becomes small when accessing a plurality of sub-blocks.

15. The method of claim 1, wherein the step of determining an address determines that sub-blocks will be arranged on a plurality of consecutive tracks when the sub-blocks cannot be stored within one of the tracks.

16. A device for controlling access to one or more disc storage devices comprising a plurality of discs storing a plurality of sub-blocks obtained by dividing data blocks, each disc being configured such that a number of sectors included at tracks in an outer section of the disc is greater than a number of sectors included at tracks in an inner section of the disc, the device comprising:

inputting means for inputting a data block;

determining means for determining how to divide the data into a plurality of associated sub-blocks and write the sub-blocks on one or more disc storage devices in such a manner that a first time required for accessing a first sub-block is equal or nearly equal to a second time required for accessing any other associated sub-block. wherein the determining means comprises:

size determining means for determining a size of each sub-block;

dividing means for dividing the data block into sub-blocks, each of which has a header and an end, according to the sizes determined by the size determining means;

address determining means for determining an address for storing each sub-block; and writing means for writing each sub-block onto the corresponding address determined by the address determining means, such that each sub-block has a skew angle defined by a location at which the sub-block's header is written and a gap angle defined by an angular separation of the sub-block's header and end; and accessing means for accessing said disc storage device on the basis of said decided information.

17. A device for writing data on one or more disc storage devices comprising a plurality of discs, wherein each disc is configured such that a number of sectors included on tracks in an outer section of the disc is greater than a number of sectors included on tracks in an inner section of the disc, the device comprising:

inputting means for inputting a data block;

determining means for determining how to divide the data into a plurality of associated sub-blocks and write the sub-blocks on one or more disc storage devices in such a manner that a first time required for accessing a first sub-block is equal or nearly equal to a second time required for accessing any other associated sub-block, wherein the determining means comprises:

size determining means for determining a size of each sub-block;

dividing means for dividing the data block into sub-blocks, each of which has a header and an end, according to the sizes determined by the size determining means;

address determining means for determining an address for storing each sub-block; and writing means for writing each sub-block onto the corresponding address determined by the address determining means, such that each sub-block has a skew angle defined by a location at which the sub-block's header is written and a gap angle defined by an angular separation of the sub-block's header and end.

18. A device for controlling access to one or more disc storage devices comprising a plurality of discs, wherein each disc is configured such that a number of sectors included on tracks in an outer section of the disc is greater than a number of sectors included on tracks in an inner section of the disc, the device comprising:

one or more device drivers for transmitting data to or from one or more disc storage devices according to address information, read commands and write commands;

a zone bit recording table memory for storing and transmitting arrangement information, wherein the arrangement information comprises information regarding the addresses of cylinders and media within the disc storage devices, and information regarding a number of available sectors at address;

a block allocator for receiving inputted format parameters, for receiving the arrangement information from the zone bit recording table memory, for generating a block map based on the format parameters and the arrangement information and for transmitting the block map;

an access request buffer for receiving access requests from a user;

a data buffer for receiving and temporarily storing data blocks which are being written to, or read from, one or more disc storage devices; and a scheduler for receiving an access request from the access request buffer, wherein the access request includes characteristics of data in the data buffer, for receiving the block map from the block allocator, for calculating an address for data in the data buffer, for generating write commands and read commands, and for transmitting the address and the write command or a read command to one or more device drivers.

19. The device of claim 18, wherein the format parameters comprise a data block size.

20. The device of claim 18, wherein the format parameters comprise a number of sub-blocks into which data blocks are divided.

21. The device of claim 18, wherein the format parameters comprise a skew value.

* * * * *